(12) United States Patent
Gharib et al.

(10) Patent No.: US 11,260,465 B2
(45) Date of Patent: Mar. 1, 2022

(54) PORTABLE AC-DC MULTI-PROCESS WELDING AND CUTTING MACHINE

(71) Applicant: The ESAB Group Inc., Florence, SC (US)

(72) Inventors: Awad Gharib, Baltimore, MD (US); Muniswamappa Anjanappa, Baltimore, MD (US); Xia Chen, Baltimore, MD (US); Pranav Sanghavi, Baltimore, MD (US); Arivukkarasu Manavalan, Baltimore, MD (US); Binod Yadav, Baltimore, MD (US)

(73) Assignee: THE ESAB GROUP INC., Florence, SC (US)

(*) Notice: Subject to any disclaimer, the term of this patent is extended or adjusted under 35 U.S.C. 154(b) by 255 days.

(21) Appl. No.: 16/169,226

(22) Filed: Oct. 24, 2018

(65) Prior Publication Data

US 2019/0126380 A1 May 2, 2019

Related U.S. Application Data

(60) Provisional application No. 62/577,334, filed on Oct. 26, 2017.

(51) Int. Cl.
*B23K 9/095* (2006.01)
*B23K 9/173* (2006.01)
(Continued)

(52) U.S. Cl.
CPC ............ *B23K 9/0953* (2013.01); *B23K 9/091* (2013.01); *B23K 9/1043* (2013.01);
(Continued)

(58) Field of Classification Search
CPC .... B23K 9/0953; B23K 9/091; B23K 9/1043; B23K 9/1062; B23K 9/1068; B23K 9/167; B23K 9/173
(Continued)

(56) References Cited

U.S. PATENT DOCUMENTS 5,025,127 A 6/1991 Gilliland
5,406,051 A * 4/1995 Lai ....................... B23K 9/1056
219/130.1
(Continued)

FOREIGN PATENT DOCUMENTS

CN 1378895 A 11/2002
CN 201499029 U 6/2010
(Continued)

OTHER PUBLICATIONS

Notification of Transmittal of International Search Report and Written Opinion including International Search Report and Written Opinion for International Application No. PCT/US2018/057275 dated Apr. 1, 2019, 13 pages.

*Primary Examiner* — Phuong T Nguyen
*Assistant Examiner* — Yeong Juen Thong
(74) *Attorney, Agent, or Firm* — Edell, Shapiro & Finnan, LLC

(57) ABSTRACT

A multi-process welding machine provides an intuitive user interface to enable a user to select among different welding processes, and to select parameters for a given selected welding process. The multi-process welding machine also provides an arrangement by which a switching module, or DC to AC converter, of an AC TIG unit can be controlled to alternatively supply AC or DC welding voltages or current. Further, a configuration of switches can be leveraged to automatically (or manually) control the polarity of welding cables for different processes and to engage or disengage a wire feeder when, e.g., a MIG welding process is selected, (Continued)

or not selected, respectively. Finally, in an embodiment, the ferrite or magnetic materials used for a main output inductor and an high frequency starting inductor of the welding machine can be combined.

14 Claims, 14 Drawing Sheets

(51) Int. Cl.
  *B23K 9/10* (2006.01)
  *B23K 9/167* (2006.01)
  *B23K 9/12* (2006.01)
  *B23K 9/09* (2006.01)
(52) U.S. Cl.
  CPC .......... *B23K 9/1062* (2013.01); *B23K 9/1068* (2013.01); *B23K 9/12* (2013.01); *B23K 9/167* (2013.01); *B23K 9/173* (2013.01)
(58) Field of Classification Search
  USPC ........ 219/130, 130.5, 125.1, 130.21, 130.31, 219/130.32, 130.33, 130.4, 137 PS; 363/17
  See application file for complete search history.

(56) References Cited

U.S. PATENT DOCUMENTS

| | | | | |
|---|---|---|---|---|
| 6,023,037 A * | 2/2000 | Church | ................ | B23K 9/1068 219/121.39 |
| 6,046,664 A | 4/2000 | Weller et al. | | |
| 7,183,517 B2 * | 2/2007 | Albrecht | ............. | H02J 2207/20 219/130.4 |
| 7,297,899 B2 | 11/2007 | Fosbinder | | |
| 7,952,051 B2 | 5/2011 | Veik | | |
| 8,299,398 B2 | 10/2012 | Madsen | | |
| 8,653,415 B2 | 2/2014 | Fosbinder | | |
| 8,759,714 B2 | 6/2014 | Fosbinder | | |
| 8,785,817 B2 | 7/2014 | Luck et al. | | |
| 8,957,344 B2 | 2/2015 | Rappl et al. | | |
| 9,108,263 B2 | 8/2015 | Manthe et al. | | |
| 9,114,471 B2 | 8/2015 | Koprivnak et al. | | |
| 9,180,543 B2 | 11/2015 | Borchert et al. | | |
| 9,238,274 B2 | 1/2016 | Cole et al. | | |
| 9,623,505 B2 | 4/2017 | Daniel et al. | | |
| 9,636,765 B2 | 5/2017 | Peters | | |
| 9,789,558 B2 | 10/2017 | Geissler et al. | | |
| 2008/0011727 A1 * | 1/2008 | Peters | ................ | B23K 9/1735 219/130.5 |
| 2009/0152251 A1 | 6/2009 | Dantinne et al. | | |
| 2011/0011842 A1 * | 1/2011 | Thomas | ............... | B23K 9/1043 219/130.21 |
| 2012/0241429 A1 | 9/2012 | Knoener et al. | | |
| 2013/0175248 A1 | 7/2013 | De Rosa | | |
| 2013/0319987 A1 | 12/2013 | Beistle et al. | | |
| 2014/0264732 A1 * | 9/2014 | Elsherbini | ............... | H01L 23/64 257/531 |
| 2014/0374395 A1 | 12/2014 | Dunahoo et al. | | |
| 2016/0087547 A1 * | 3/2016 | Yamada | ............... | H02M 1/4225 318/400.3 |
| 2017/0165775 A1 | 6/2017 | Knoener | | |
| 2017/0252849 A1 | 9/2017 | Ryan et al. | | |
| 2017/0282276 A1 | 10/2017 | Knoener et al. | | |
| 2017/0320157 A1 * | 11/2017 | Zhang | ................ | B23K 9/1043 |
| 2019/0030634 A1 * | 1/2019 | Henry | ................ | B23K 9/1056 |

FOREIGN PATENT DOCUMENTS

| | | |
|---|---|---|
| EP | 0001815 A1 | 5/1979 |
| KR | 20110072809 A | 6/2011 |

* cited by examiner

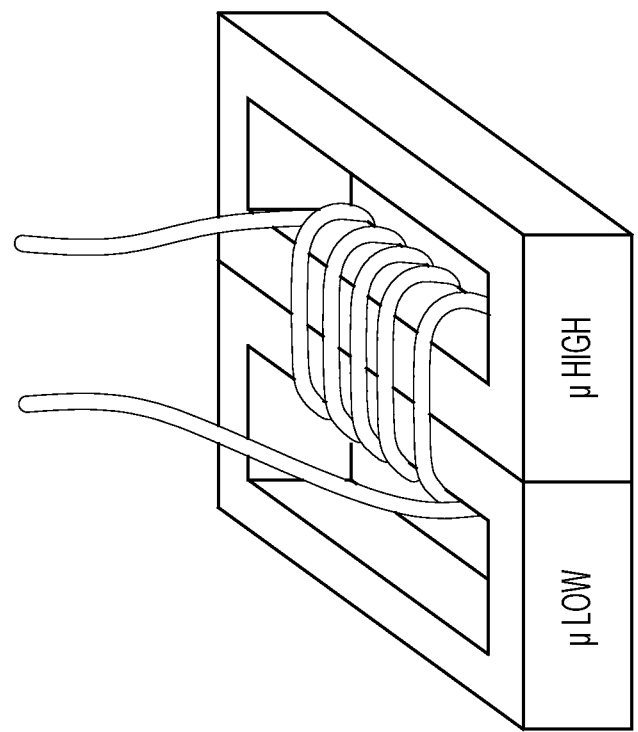
FIG.11A INTEGRATED MAGNETICS
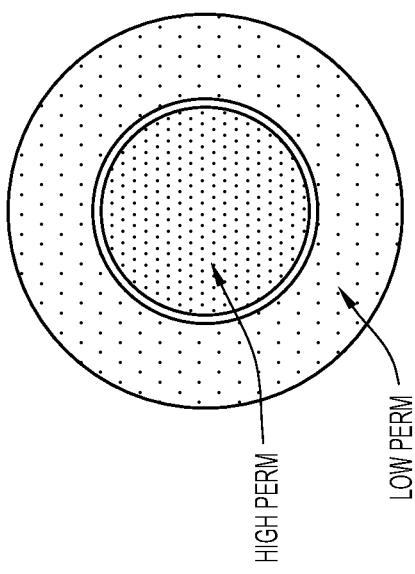
FIG.11B MAGNETIC CORE CROSS SECTION
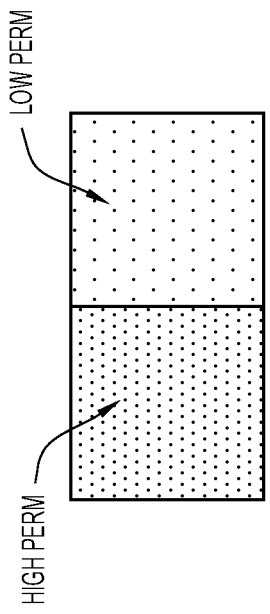
FIG.11C

PORTABLE AC-DC MULTI-PROCESS WELDING AND CUTTING MACHINE

This application claims the benefit of U.S. Provisional Application Ser. No. 62/577,334, filed Oct. 26, 2017, the subject matter of which is incorporated herein by reference.

FIELD OF THE DISCLOSURE

The present disclosure generally relates to welding and cutting equipment and, more particularly, to AC-DC control techniques in a portable, multi-process welding and cutting machine.

BACKGROUND OF THE DISCLOSURE

Portable welding and cutting systems are known, and often incorporate a power supply and related mechanisms (e.g., wire feeder, wire spool) in a portable case. Such portable welding systems find use in applications where it is not practical or convenient to send a work-piece to a shop for repair or fabrication. Examples of applications for such portable welding systems include petroleum and chemical equipment fabrication, shipboard installation and repair, and the like. As such, known portable welding systems may be relatively lightweight to enable a user to lift and carry the system to a work site. Because of the portability and flexibility of these welding systems they have found widespread use and popularity.

There are many welding processes or techniques that are now available to a technician including stick welding, tungsten inert gas (TIG) welding, and metal inert gas (MIG) welding (which may also rely on a wire feeder mechanism), among other welding techniques. Each of these processes and techniques has its set of advantages and disadvantages, and certain processes and techniques may be more convenient, efficient, or beneficial for a given job and type of material being welded or cut. To make such multiple processes more easily/readily available, multi-process welding machines have been designed and marketed, but providing a single machine that can support each of these techniques in an efficient, economical and intuitive manner, and a single machine that is truly portable, can be challenging.

SUMMARY OF THE DISCLOSURE

Embodiments described herein combine, at least, the following welding processes in a single compact unit: (1) stick, (2) AC and DC TIG, and (3) MIG (with internal spool), that are all selectable and controllable via a graphical user interface (GUI) that enables a user to easily choose from among the different processes, and configure parameters for a given selected process.

In accordance with the described embodiments, a multi-process welding machine provides an intuitive user interface to enable a user to select among different welding processes, and to select parameters for a given selected welding process. The multi-process welding machine also provides an arrangement by which a switching module, or DC to AC converter, of an AC TIG unit can be controlled to alternatively supply AC or DC welding current (voltage) depending on the welding process selected. Further, the configuration of switches can be leveraged to automatically (or manually) control the polarity of welding cables for different processes and to engage or to disengage a wire feeder when, e.g., MIG welding is selected, or not selected, as the case may be. Finally, in an embodiment, ferrite or magnetic materials used for a main output inductor and an HF starting inductor of the welding machine can be combined to achieve cost and weight savings.

BRIEF DESCRIPTION OF THE DRAWINGS

By way of example, embodiments of the disclosed systems and methods will now be described, with reference to the accompanying drawings, in which:

FIGS. 10 and 11A-11C illustrate combining magnetics of the multi-process welding machine's main output inductor and high frequency start circuit's inductor in accordance with an example embodiment;

DETAILED DESCRIPTION

Figure 1A:
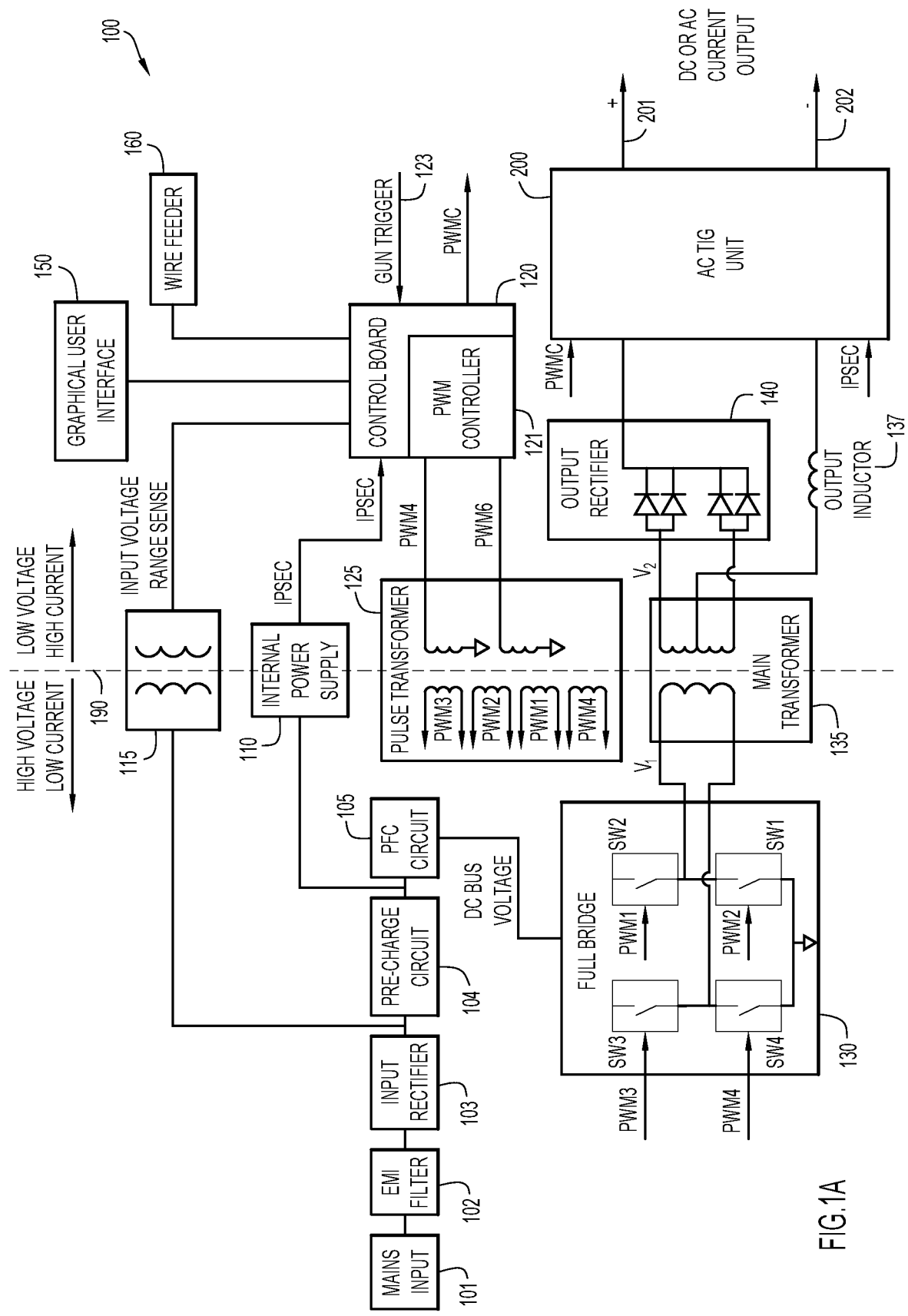
FIG. 1A is a block diagram of a multi-process welding machine in accordance with an example embodiment.

FIG. 1A is a block diagram of a multi-process welding machine 100 in accordance with an example embodiment. The embodiments described herein focus on welding process. However, those skilled in the art will appreciate that the circuitry and methodologies described herein may also be applicable to cutting processes. As shown in FIG. 1A, machine 100 includes a mains input 101, an electromagnetic interference (EMI) filter 102 and an input rectifier 103. The output of input rectifier 103 is connected, via an isolating transformer 115, to a main control board 120 that, among other possible functions, monitors an input voltage range from an output of the input rectifier 103.

Input rectifier 103 also provides its output to a pre-charge circuit 104, whose output is fed to power factor control (PFC) circuit 105 and to internal power supply (IPS) 110, which generates a voltage supply signal named "IPS Sec."

IPS Sec is used to supply power to other components, including control board 120 and AC TIG unit 200, which are discussed below.

The output of PFC circuit 105 may be referred to as the "DC Bus Voltage" and is supplied to a full bridge converter 130, which converts the DC Bus Voltage to an AC voltage $V_1$ that is fed to main transformer 135. Conversion of the DC Bus Voltage to AC is controlled via pulse wave modulated (PWM) signals PWM A, PWM B that are generated by PWM controller 121, which may be part of main control board 120. PWM signals PWM A, PWM B are supplied to pulse transformer 125, which generates signals PWM 1, PWM 2, PWM 3 and PWM 4 to switch respective IGBT switches SW1, SW2, SW3, SW4, in full bridge converter 130, the output of which is fed to main transformer 135. In an embodiment, the various PWM signals can be arranged to generate a relatively high frequency (e.g., 100 Hz-47 KHz) that enables main transformer 135 to have a smaller, and thus lighter, footprint.

A positive output of main transformer 135, carrying a voltage $V_2$, is fed through output rectifier 140 (which may include multiple diodes to efficiently handle the relatively high levels of current), and a negative output of the main transformer is connected to an output inductor 137.

A broken line 190 indicates a demarcation between a high voltage/low current side of welding machine 100 and a low voltage/high current side of welding machine 100. In a preferred implementation, to the extent possible, and for purposes of safety, the two sides are kept electrically isolated from each other.

As still further shown in FIG. 1A, a user interface 150, including a graphical display, is in communication with main control board 120 and enables a user to select among multiple possible welding processes, and parameters for a given selected welding process.

A wire feeder 160, whose drive motor is controlled by main control board 120 is provided for, e.g., a MIG welding process. A gun trigger input signal 123 is provided to control board 120 to trigger the control board to initiate and maintain an appropriate welding voltage/current (or high frequency start signal) generated by machine 100.

Figure 1B:
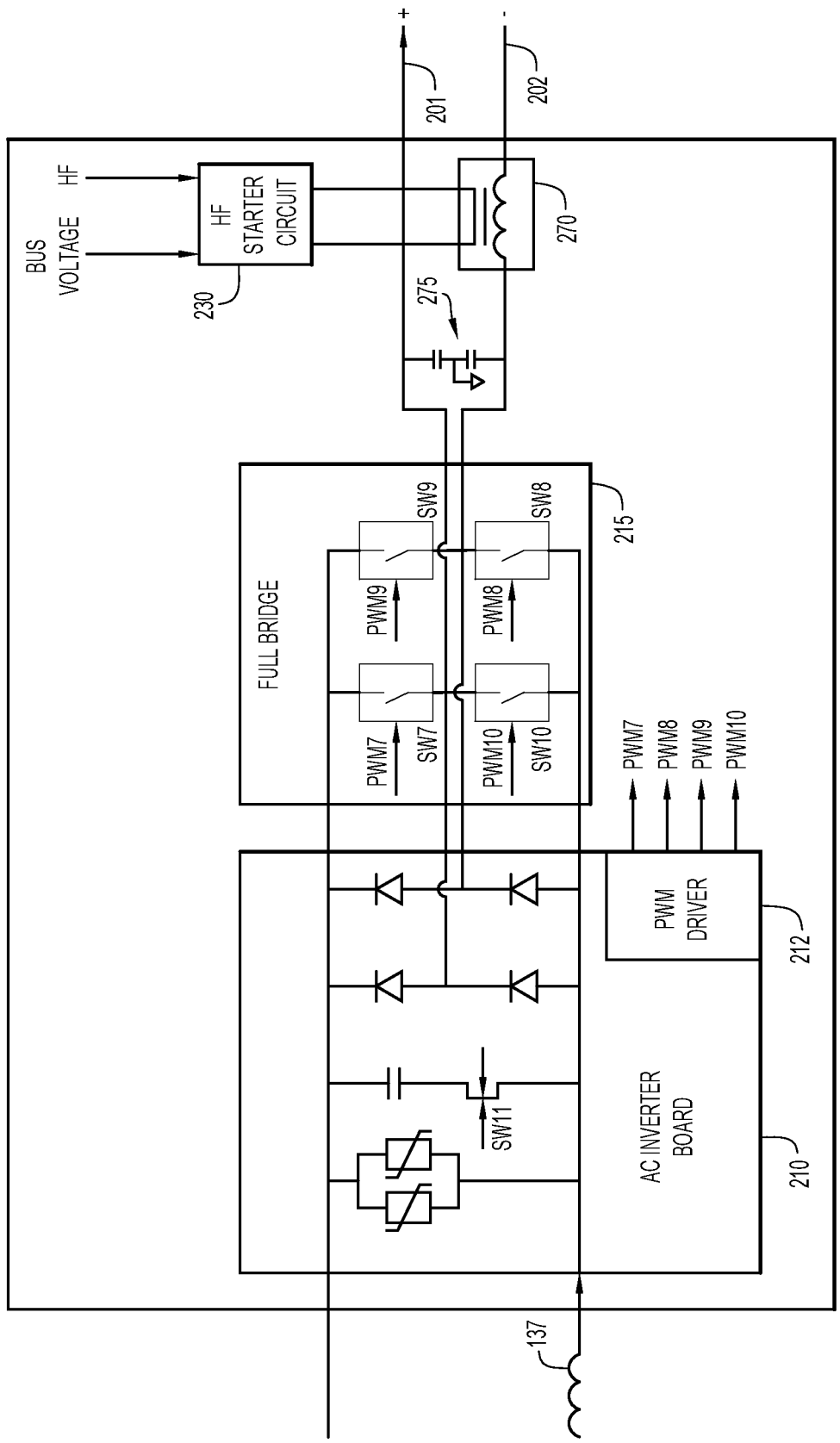
FIG. 1B is a block diagram of an AC TIG unit that is configured to output DC current or AC current in accordance with a user selected process.

Finally, an AC TIG unit 200 is provided. AC TIG unit 200, described in more detail in connection with FIG. 1B, is connected to an output of output rectifier 140 and thus receives a rectified voltage from an output of main transformer 135. Output inductor 137 is disposed between a center tap of main transformer 135 and AC TIG unit 200. Thus, in an embodiment, AC TIG unit 200 passes all welding current to welding cables 201, 202, regardless of the type of process being used. As shown, AC TIG unit 200 receives a signal PWM C from control board 120 that controls the frequency and duty cycle of the AC current generated by the AC TIG unit 200. Also provided to AC TIG unit 200 is IPS Sec to provide operating power for the AC TIG unit 200. Thus, in an embodiment, AC TIG unit 200 is configured to receive an output of output rectifier 140, and output at least one of a DC welding current or an AC welding current according to input received via the graphical user interface. In a particular implementation, the DC welding current passes through at least one electronic switching device configured to generate the AC welding current.

As shown in FIG. 1B AC TIG unit 200 includes an AC inverter board 210, a PWM driver 212, a full bridge converter (or switching module) 215 including switches SW7, SW8, SW9, SW10 that are driven by PWM signals PWM 7, PWM 8, PWM 9, PWM 10, respectively, a high frequency (HF) start circuit 230 and associated HF inductor 270. As shown, AC inverter board 210 generates and supplies pulse wave modulated signals PWM 7, PWM 8, PWM 9, PWM 10 to respective IGBT switches SW 7, SW 8, SW 9, SW 10 in full bridge converter or switching module 215 to convert the supplied DC voltage from output rectifier 140 to AC voltage used for, e.g., AC TIG welding. An HF bypass circuit 275, comprising, e.g., suitable capacitors is provided to keep HF signals from interfering with electronics in the AC TIG unit 200.

As will be appreciated by those skilled in the art, DC welding current supplied from output rectifier 140 passes through AC TIG unit 200. AC TIG unit 200, by manipulating switches in full bridge converter 215, can be configured to pass that DC welding current, without any further manipulation thereof, to welding cables 201, 202 for DC welding processes, or to convert the DC welding current to a desired AC current for AC welding processes.

Figure 2:
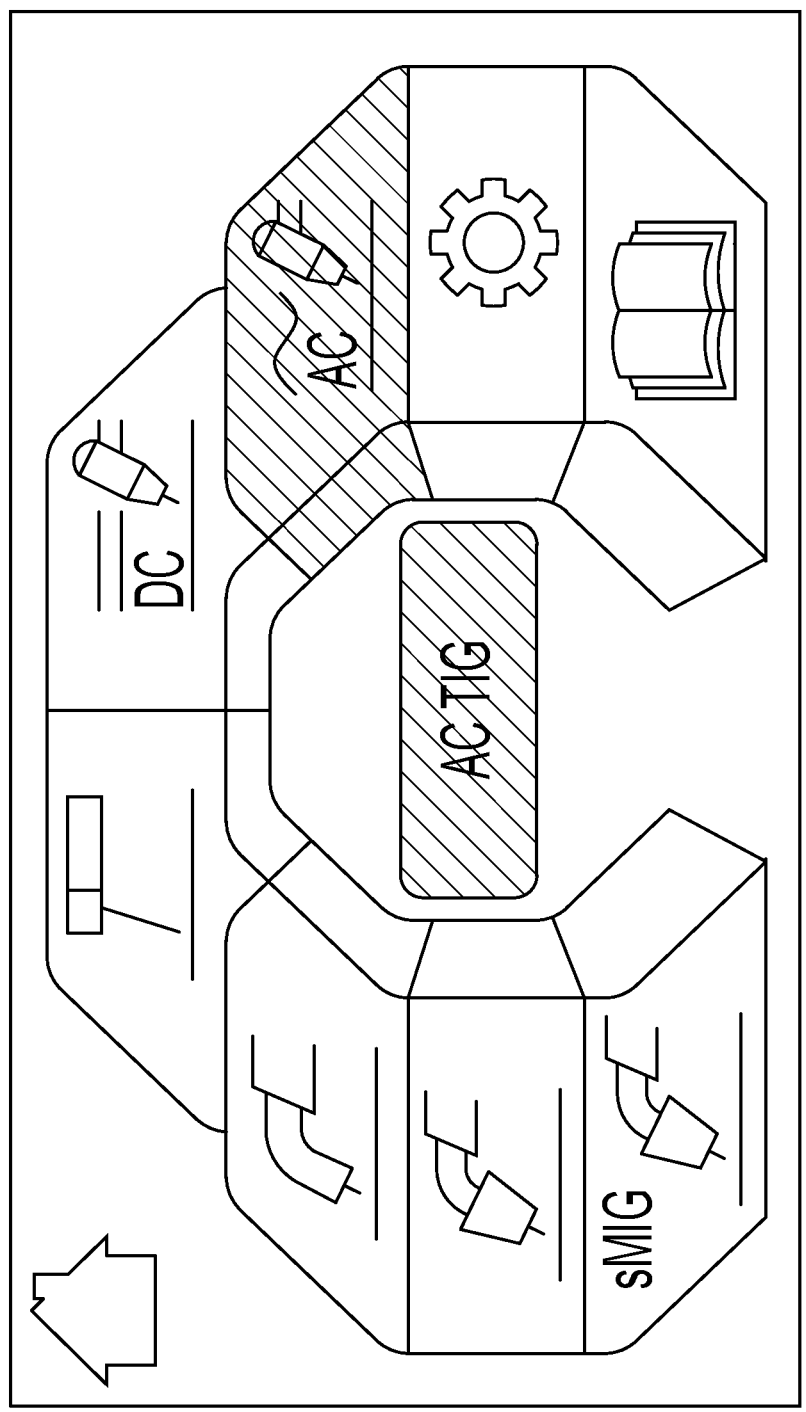
FIGS. 2 and 3A-3F depict example screen shots, which may be displayed on a graphical user interface, for selecting a given welding process in accordance with an example embodiment.
Figure 3D:
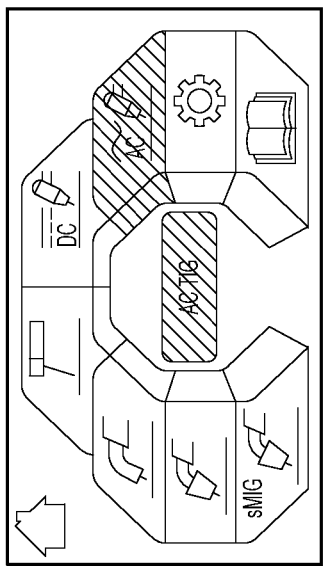
Figure 3E:
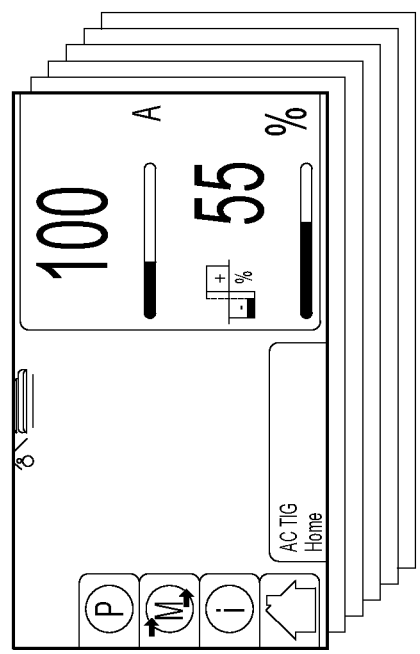
Figure 3F:
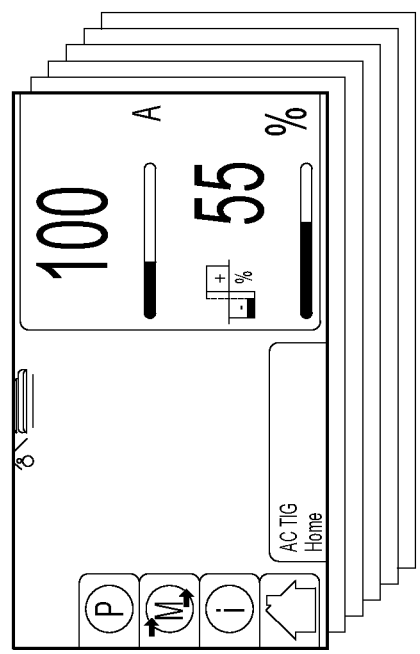
Figure 3A:
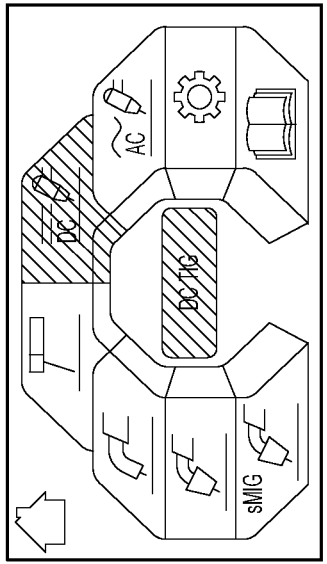
Figure 3B:
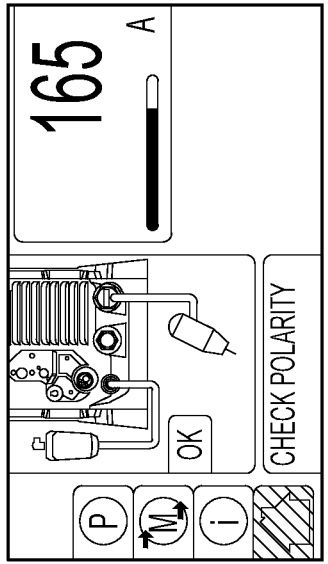
Figure 3C:
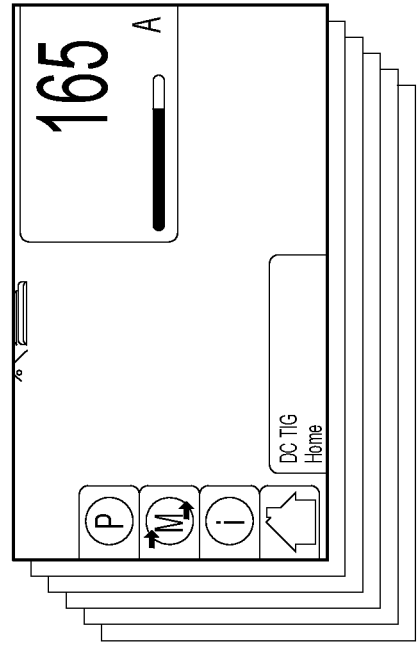

FIGS. 2 and 3A-3F depict example screen shots, which may be displayed on a graphical user interface 150, for selecting a given welding process in accordance with an example embodiment. In one implementation, the graphical user interface 150 is controlled by a user via a selector knob (not shown), which, when turned, successively highlights a given icon that corresponds to a given welding process or welding parameter. In the case of FIG. 2, the AC TIG welding process is shown as highlighted and ready to be selected. As a result of selecting the AC TIG welding process, main control board 120 is configured to send a signal to AC inverter board 210 to generate pulse wave modulated signals PWM 7, PWM 8, PWM, 9, PWM 10 that are supplied to full bridge converter 215 to convert the DC voltage supplied from output rectifier 140 to AC voltage used for the AC TIG process.

FIGS. 3A-3F depict example user interface thumbnails of user interface screens that may be provided in connection with DC TIG and AC TIG welding processes. Via these several user interface screens it is possible to select and modify parameters to control these welding techniques. Those skilled in the art will appreciate that the icons and GUI arrangements shown in FIGS. 2 and 3A-3F are examples only and are not meant to be limiting or restrictive in any way.

Figure 4:
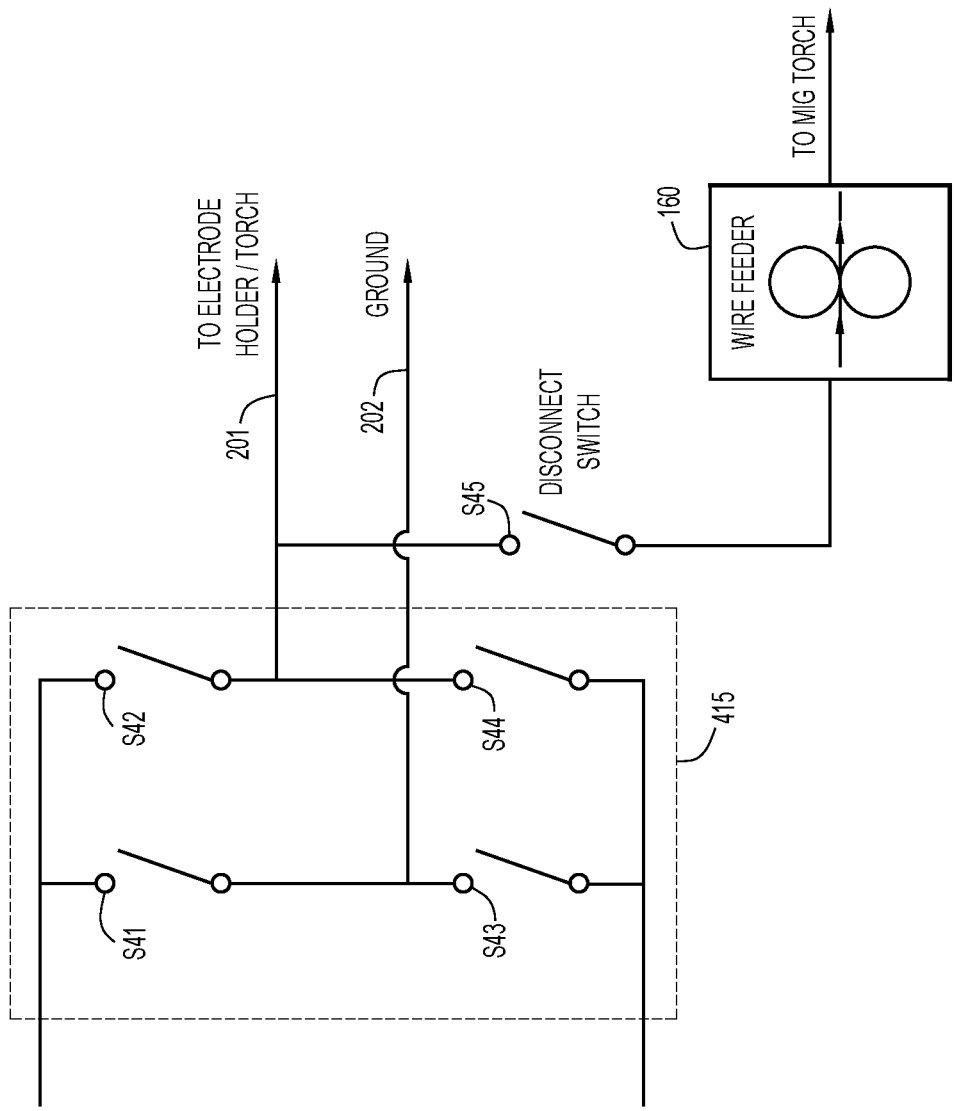
FIG. 4 shows a one switch module polarity elimination circuit and mechanical wire feeder disconnect switch in accordance with an example embodiment.

FIG. 4 shows, as an aspect of AC TIG unit 200, a one switch module polarity elimination circuit and mechanical wire feeder disconnect switch in accordance with an example embodiment. As noted, the multi-process welding machine described herein includes AC TIG unit 200 (FIGS. 1A and 1B) that provides the desired AC voltage for an AC TIG process, when so selected. FIG. 4 shows how switches in a full bridge converter or switching module 415 may be configured to provide DC electrode positive or DC electrode negative modes of operation in AC TIG unit 200. That is, switches S41, S42, S43 and S44 can be configured ON or OFF to cause welding cable 201 to be positive or negative, and welding cable 202 to be the opposite polarity of welding cable 201. In one example, switches S42 and S43 operate ON for electrode positive output, and switches S41 and S44 operate ON for electrode negative output.

In addition, a disconnect switch S45 is provided. Switch S45 may be a bidirectional electronic, mechanical, optical or electromechanical switch. Switch S45 is configured to automatically disconnect power to wire feeder 160 when the multi-process welding machine is, e.g., not configured for a MIG or Flux core welding process.

Figure 5:
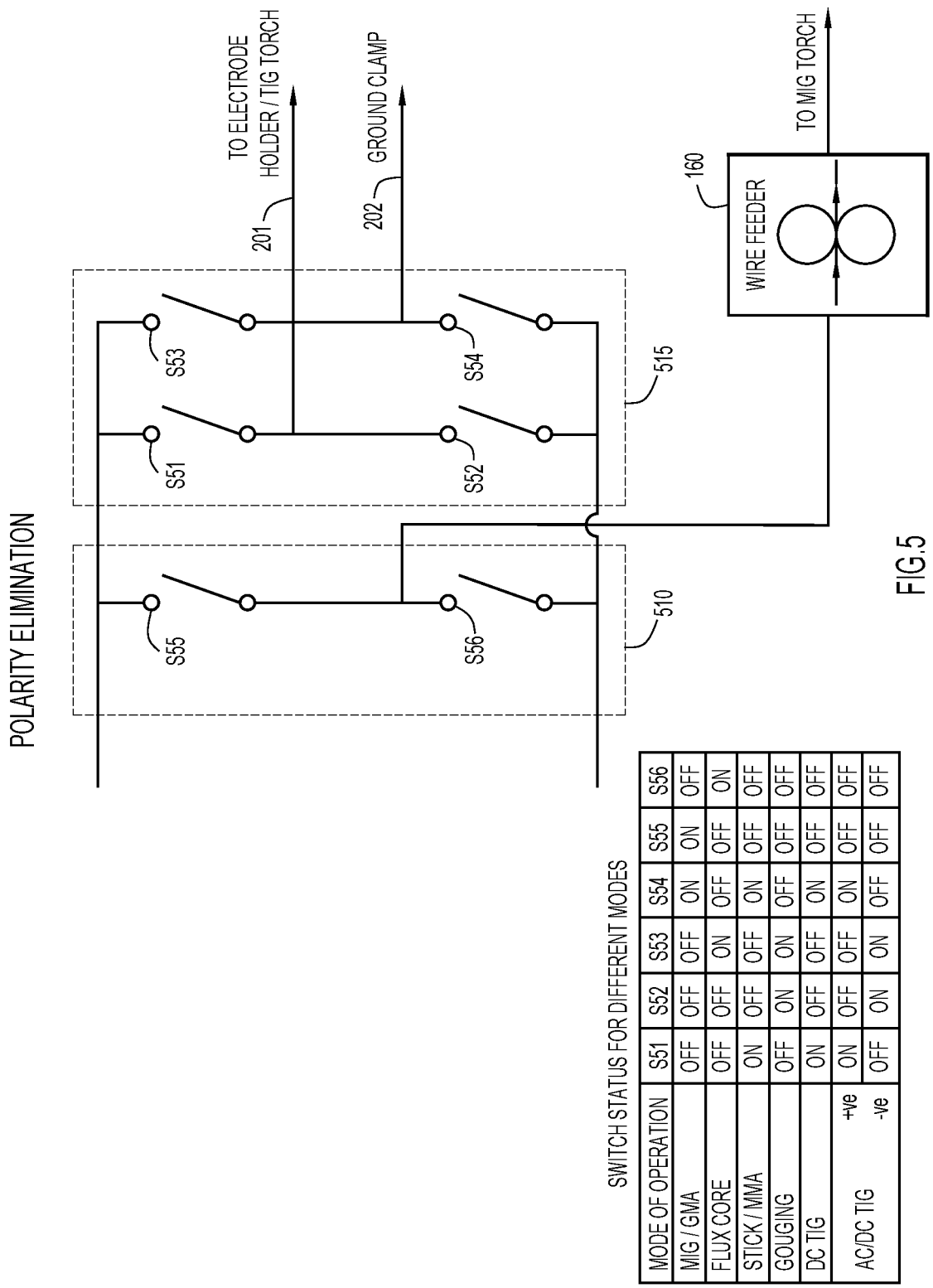
FIG. 5 shows a two switch module polarity elimination circuit in accordance with an example embodiment.

FIG. 5 shows, as an aspect of AC TIG unit 200, a two switch module polarity elimination circuit in accordance with an example embodiment. In the embodiment of FIG. 5, a MIG torch (not shown) is connected with the multi-process welding machine 100 through only one switch in polarity elimination circuit 510, either S55 or S56, depending on the polarity selected. FIG. 5 also includes a table of the configuration of all switches S51, S52, S53, S54 (in full bridge converter or switching module 515), S55 and S56, depending on the type of welding process selected.

Figure 6:
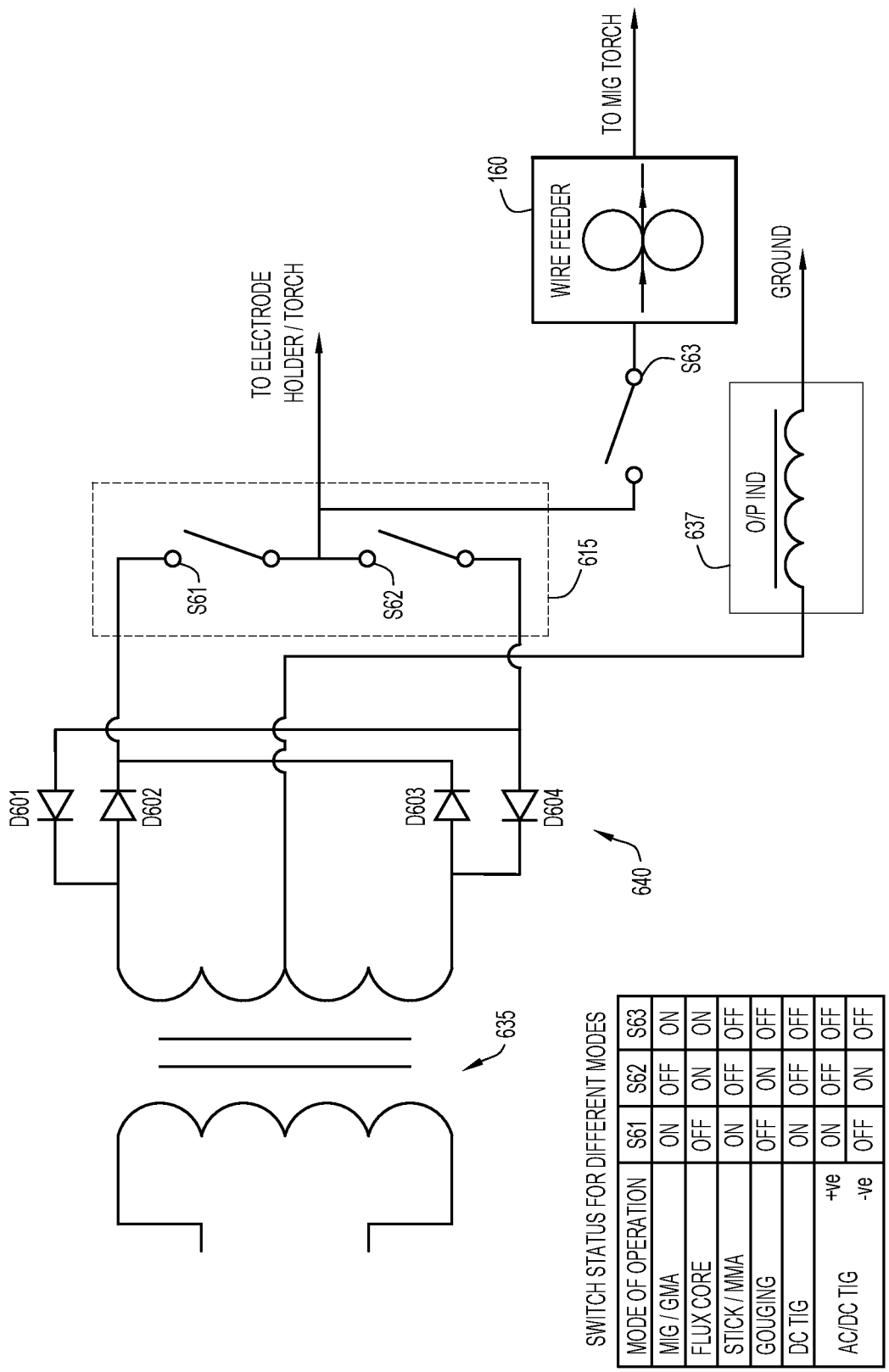
FIG. 6 shows a circuit configured to reduce AC-DC loss using two power switches in accordance with an example embodiment.

FIG. 6 shows a circuit configured to reduce AC-DC loss using two power switches in accordance with an example embodiment. The components depicted in FIG. 6 can be thought of as replacing several components shown in FIGS. 1A and 1B. That is, FIG. 6 includes main transformer 635, which, instead of feeding an AC inverter board as shown in FIG. 1A, supplies power to diode network 640 comprising diodes D601, D602, D603 and D604. A center tap from main transformer 635 is connected to output inductor 637. FIG. 6 also includes switching module 615 that is configured to supply AC voltage or DC voltage. Also shown is a table of the configuration of switches S61, S62 and S63 depending on the type of welding process selected. By eliminating switches that are present in the configuration of FIGS. 1A and 1B power loss can be reduced.

Figure 7:
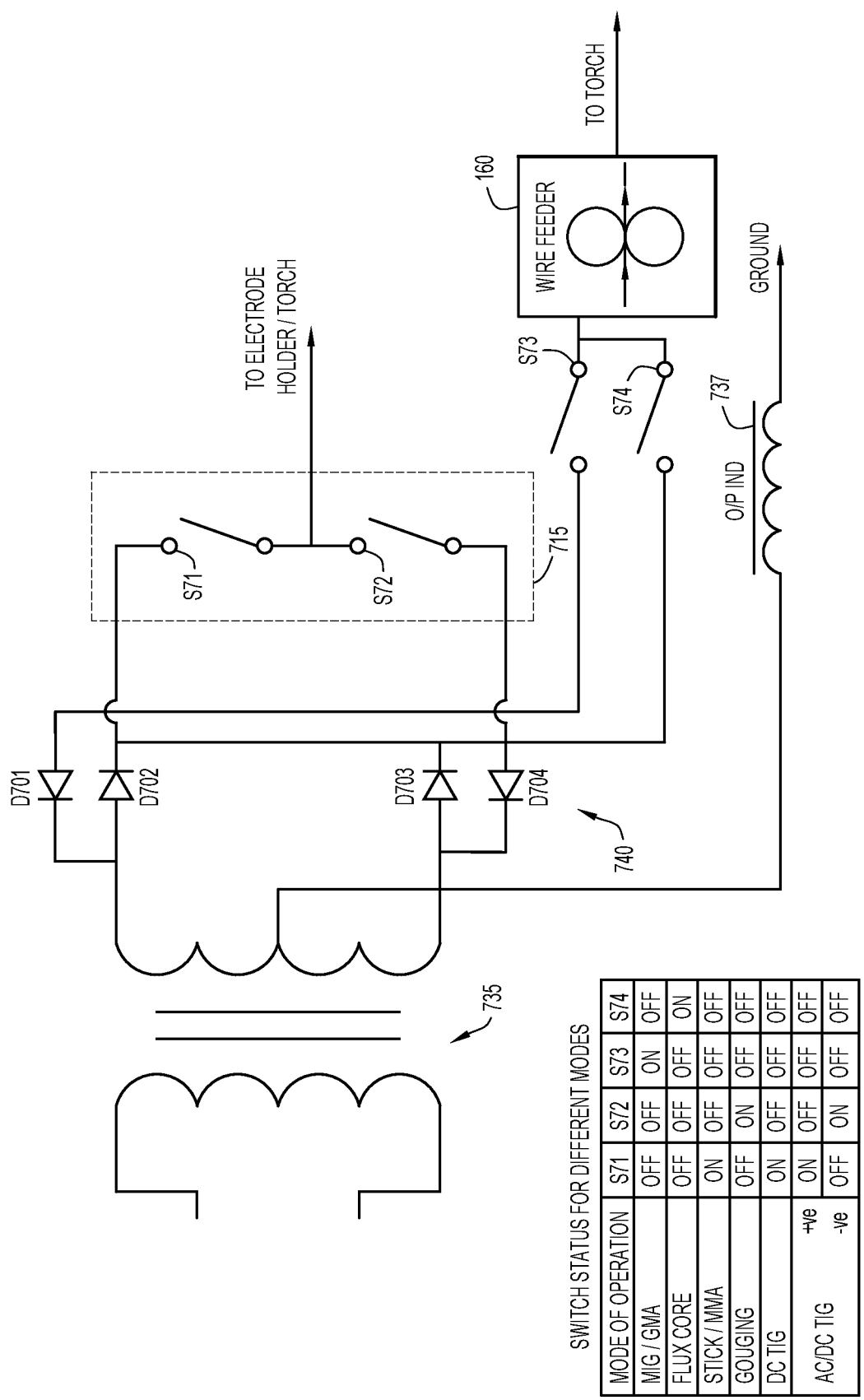
FIG. 7 shows another circuit configured to reduce AC-DC loss using two power switches in accordance with an example embodiment.

FIG. 7 shows another circuit configured to reduce AC-DC loss using two power switches in accordance with an example embodiment. The components depicted in FIG. 7 can be thought of as replacing several components shown in FIGS. 1A and 1B. That is, FIG. 7 includes main transformer 735, which, instead of feeding an AC inverter board as shown in FIG. 1B, supplies power to diode network 740 comprising diodes D701, D702, D703 and D704. A center tap from main transformer 735 is connected to output inductor 737. FIG. 7 also includes switching module 715 that is configured to supply AC voltage or DC voltage. FIG. 7 also includes a table of the configuration of switches S71, S72, S73 and S74 depending on the type of welding process selected. By eliminating switches that are present in the configuration of FIG. 1B, and further eliminating another switch between the wire feeder/torch supply, compared to the configuration in FIG. 6, still more power loss can be reduced.

Figure 8:
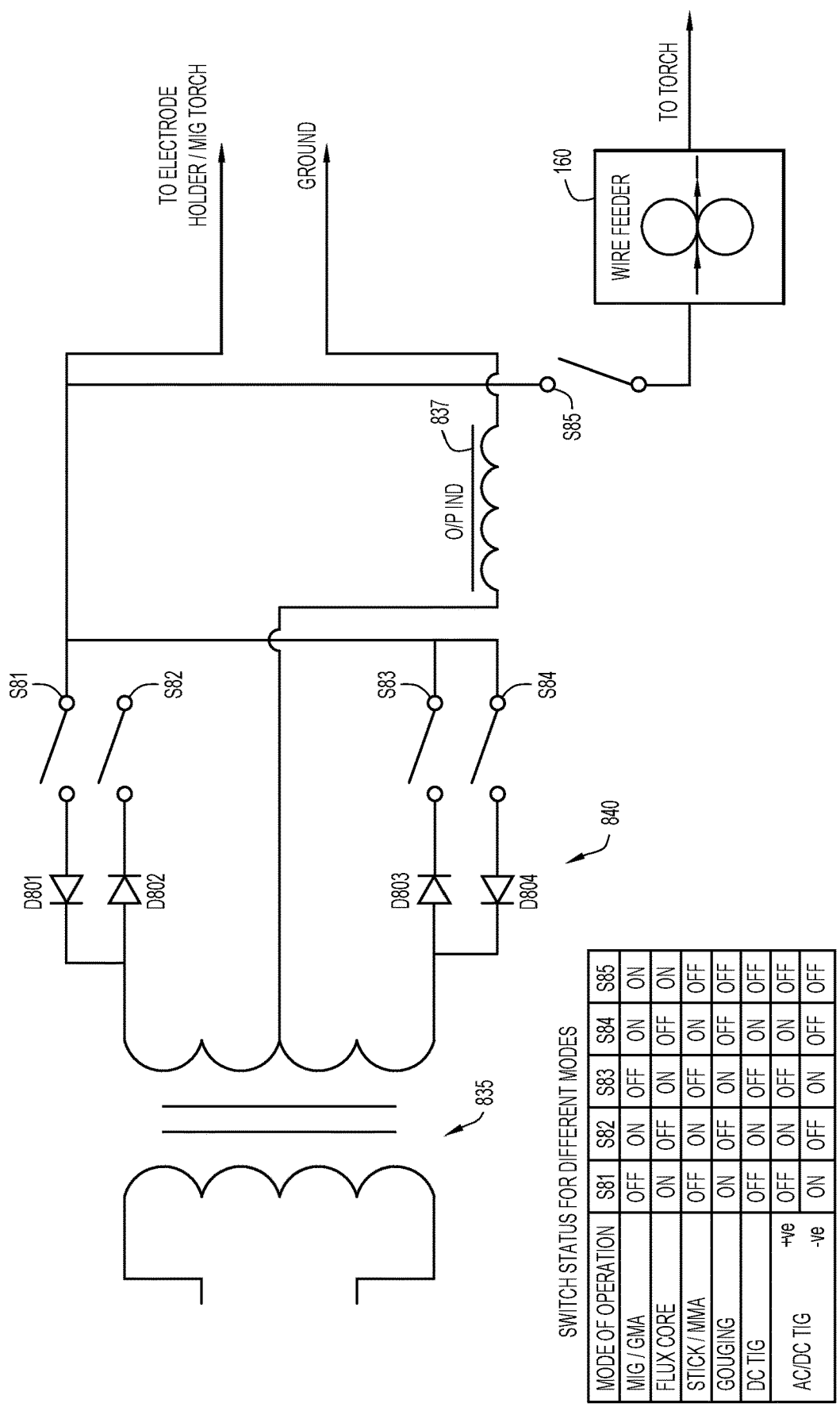
FIG. 8 shows another circuit configured to reduce AC-DC loss using four switches in accordance with an example embodiment.

FIG. 8 shows another circuit configured to reduce AC-DC loss using four switches in accordance with an example embodiment. The components depicted in FIG. 8 can be thought of as replacing several components shown in FIGS. 1A and 1B. That is, FIG. 8 includes main transformer 835 which, instead of feeding an AC inverter board as shown in FIG. 1, supplies power to diode network 840 comprising diodes D801, D802, D803, and D804. A center tap from main transformer 835 is connected to output inductor 837. FIG. 8 also includes a table of the configuration of switches S81, S82, S83, S84 and S85 depending on the type of welding process selected. By eliminating switches that are present in the configuration of FIG. 1B, and further eliminating another switch between the wire feeder/torch supply, compared to the configuration in FIG. 6, still more power loss can be reduced.

Figure 9:
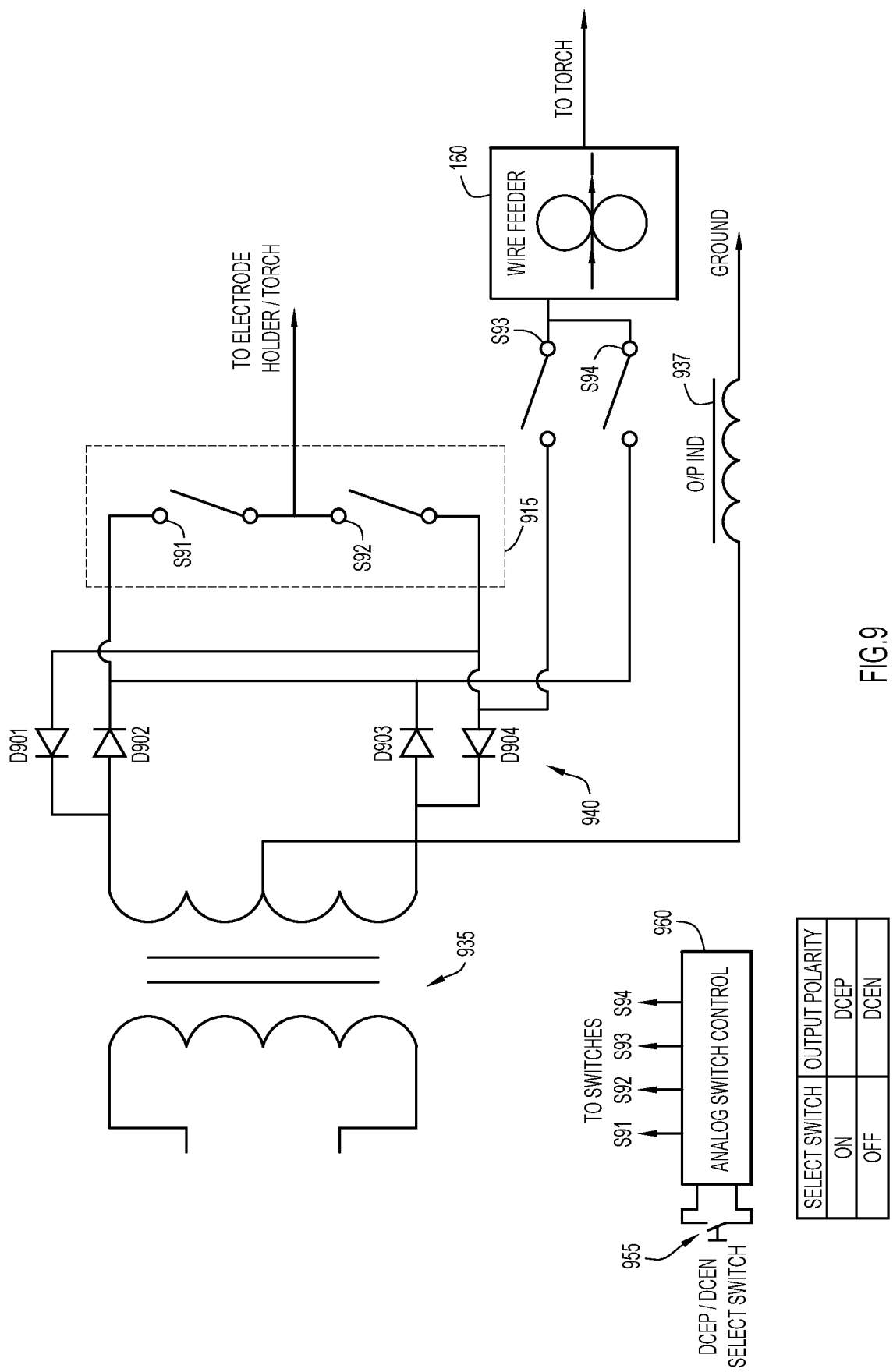
FIG. 9 shows a circuit configured to select welding cable polarity in accordance with an example embodiment.

FIG. 9 shows a circuit configured to select welding cable polarity in accordance with an example embodiment. The components depicted in FIG. 9 can be thought of as replacing several components shown in FIGS. 1A and 1B. That is, FIG. 9 includes main transformer 935 which, instead of feeding an AC inverter board as shown in FIG. 1B, supplies power to diode network 940 comprising diodes D901, D902, D903 and D904. A center tap from main transformer 935 is connected to output inductor 937. FIG. 9 also includes switching module 915 that is configured to select DC voltage polarity. FIG. 9 further shows analog switch control module 960 that is controllable via select switch 955 to select DC electrode positive (DCEP), or DC electrode negative (DCEN) for a given welding process. Once selected, switches S91, S92, S93 and S94 are automatically configured for the selected electrode polarity arrangement.

Figure 10:
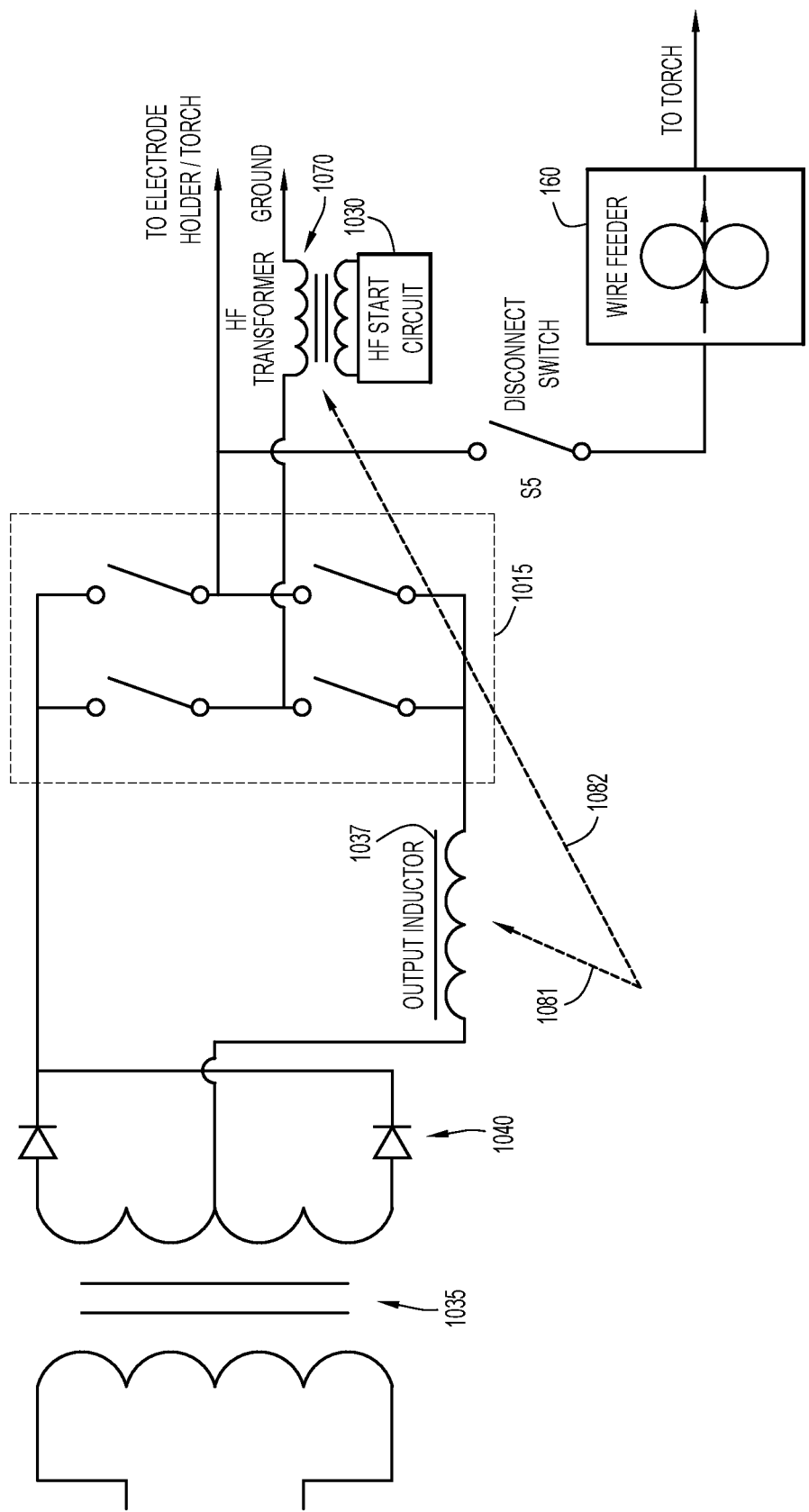

FIGS. 10 and 11A-11C illustrate combining magnetics of the multi-process welding machine's main output inductor and high frequency start circuit's inductor in accordance with an example embodiment. Components depicted in FIG. 10 are similar to those shown in FIGS. 1A and 1B. That is, FIG. 10 includes main transformer 1035, which feeds an output rectifier 1040, which supplies power to switching module 1015, which can provide an AC output or be configured to supply a DC output depending on a selected configuration of the multi-process welding machine. A center tap from main transformer 1035 is connected to output inductor 1037. Also shown is HF start circuit 1030 that is connected to HF transformer 1070.

An output inductor, like 1037, is designed to operate at high current with minimum inductance roll off by using relatively low permeability ferrite or magnetic material. On the other hand, an HF transformer, like 1070, is designed to handle high voltage per turn with relatively high permeability ferrite or magnetic material. In one possible implementation, and in order to, e.g., save space and cost, the magnetics of output inductor 1037 and HF transformer 1070 are combined, as indicated by broken arrows 1081 and 1082.

FIG. 11A shows an example arrangement of high and low permeability materials around which the output inductor 1037 and HF transformer 1070 coils can be wrapped. FIGS. 11A and 11C show high and low permeability materials arranged next to each other, and FIG. 11B shows the high and low permeability materials arranged concentrically. The magnetic materials can also be comingled into a homogenous structure, with each of the magnetic materials responding appropriately based on the frequency presented, number of turns wound, etc.

Figure 12C:
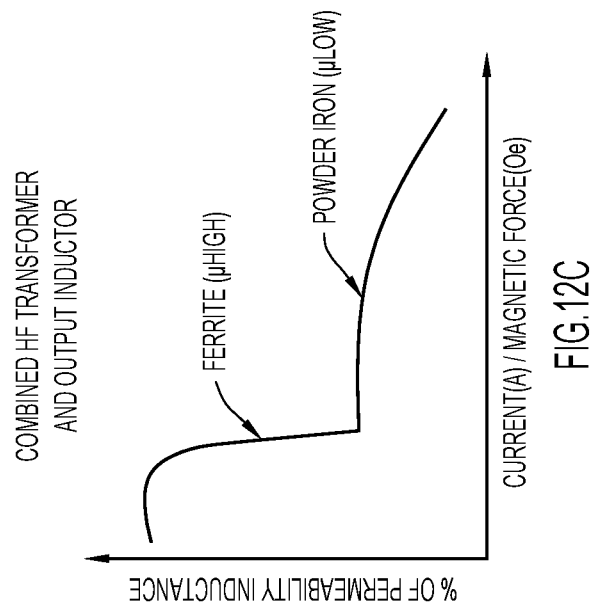
FIGS. 12A-12C are graphs illustrating how the performance of high permeability material and the performance of low permeability material is combined to achieve an overall inductance performance envelope suitable for both an output inductor and an HF transformer of a multi-process welding machine in accordance with an example embodiment.
Figure 12A:
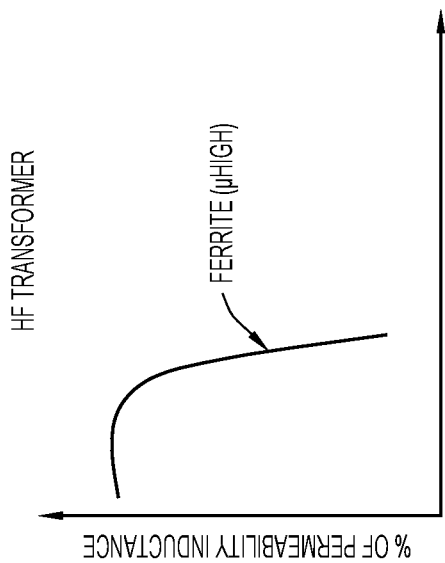
Figure 12B:
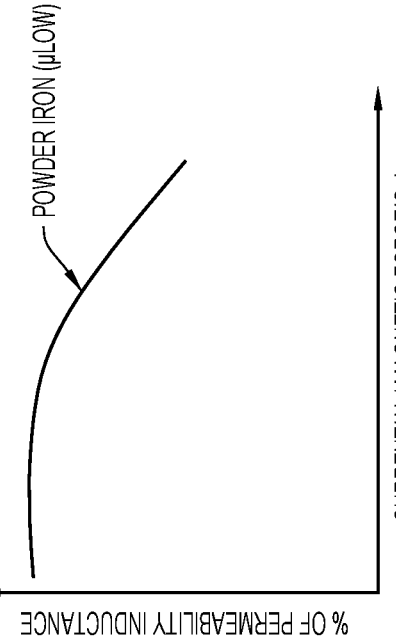

FIGS. 12A-12C are graphs illustrating how the performance of high permeability material (FIG. 12A) and the performance of low permeability material (FIG. 12B) is combined to achieve an overall inductance performance curve (FIG. 12C) suitable for both an output inductor and HF transformer of a multi-process welding machine.

Figure 13:
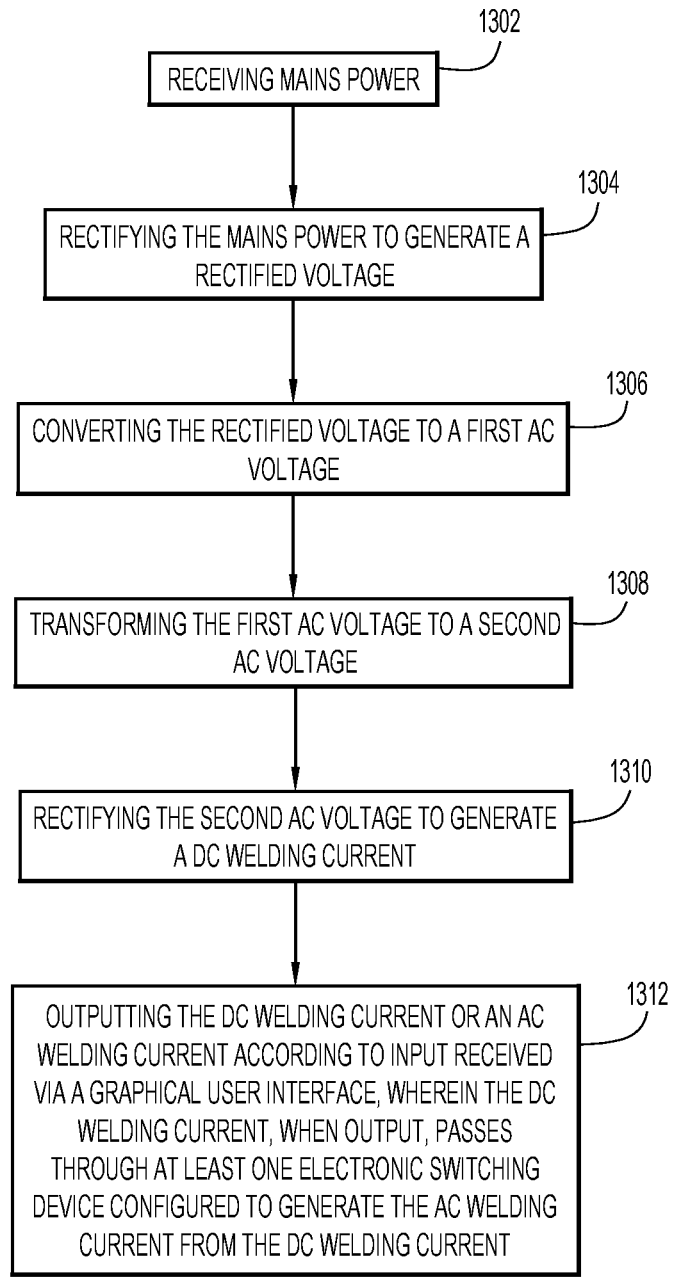
FIG. 13 is a flow chart depicting a series of operations for operating a multi-process welding or cutting machine in accordance with an example embodiment.

FIG. 13 is a flow chart depicting a series of operations for operating a multi-process welding or cutting machine in accordance with an example embodiment. At 1302 the methodology receives mains power. At 1304, the mains power is rectified to generate a rectified voltage. At 1306, the rectified voltage is converted to a first AC voltage. At 1308, the first AC voltage is transformed to a second AC voltage. At 1310, the second AC voltage is rectified to generate a DC welding current. And, at 1312, the a multi-process welding or cutting machine outputs the DC welding current or an AC welding current according to input received via a graphical user interface, wherein the DC welding current, when output, passes through at least one electronic switching device configured to generate the AC welding current from the DC welding current.

Thus, embodiments described herein provide a multi-process welding machine that provides an intuitive user interface to enable a user to select among different welding processes, and to select parameters for a given selected welding process. The multi-process welding machine also provides an arrangement by which a switching module or DC to AC converter of an AC TIG unit can be controlled to alternatively supply AC or DC welding voltages. Further, the configuration of switches can be leveraged to automatically (or manually) control the polarity of the welding cables for different processes and to engage or disengage a wire feeder when, e.g., MIG welding is selected, or not selected, respectively. Finally, in an embodiment, the ferrite or magnetic materials used for a main output inductor and an HF starting inductor can be combined.

The above description is intended by way of example only. Various modifications and structural changes may be made therein without departing from the scope of the concepts described herein and within the scope and range of equivalents of the claims.

What is claimed is:

1. A portable welding system, comprising:
a display configured to display a graphical user interface;
a power input configured to receive mains power;
a rectifier connected to the power input and configured to output a rectified voltage;
a first full bridge converter, in communication with the rectifier, that converts the rectified voltage to a first AC voltage;
a control board that supplies first and second pulse wave modulated (PWM) signals to the first full bridge converter and that control switches that convert the rectified voltage to the first AC voltage;
a main transformer configured to transform the first AC voltage to a second AC voltage;
an output rectifier, in communication with a secondary of the main transformer, configured to rectify the second AC voltage and output a DC welding current;
an AC unit, comprising a second full bridge converter, configured to receive an output of the output rectifier, and selectively output at least one of the DC welding current or an AC welding current according to user input received via the graphical user interface;
a main output inductor in communication with the secondary of the main transformer; and
a high frequency starting inductor connected in series with a welding cable,
wherein the DC welding current, when output, passes through at least one electronic switch of the second full bridge converter, and a polarity of the DC welding current supplied to a wire feeder, when output, is selectable via operation of two switches that connect, respectively, to a first output of the portable welding system and a second output of the portable welding system, wherein the two switches, the at least one electronic switch of the second full bridge converter and the switches of the first full bride converter are separated respectively,
wherein the wire feeder is automatically engaged according to input received via the graphical user interface.

2. The portable welding system of claim 1, wherein the DC welding current is configured for a DC welding process.

3. The portable welding system of claim 2, wherein the DC welding process is a metal inert gas (MIG) welding process.

4. The portable welding system of claim 1, wherein the AC welding current is configured for an AC welding process.

5. The portable welding system of claim 4, wherein the AC welding process is an AC tungsten inert gas (TIG) welding process.

6. The portable welding system of claim 1, wherein the polarity of DC welding current, when output from the portable welding system, is automatically selected according to input received via the graphical user interface.

7. The portable welding system of claim 1, wherein the polarity of the DC welding current, when output, is selectable via a manual switch.

8. A method applied to a portable welding system, comprising:
receiving mains power;
rectifying the mains power to generate a rectified voltage;
sensing a voltage range of the rectified voltage;
converting the rectified voltage to a first AC voltage;
transforming the first AC voltage to a second AC voltage based on first and second pulse wave modulated (PWM) signals supplied by a control board;
rectifying the second AC voltage to generate a DC welding current; and
selectively outputting the DC welding current or an AC welding current according to user input received via a graphical user interface,
wherein the DC welding current, when output, passes through at least one electronic switching device of a full bridge converter that generates the AC welding current from the DC welding current, and a polarity of the DC welding current supplied to a wire feeder, when output, is selectable by controlling two switches that connect, respectively, to a first output of the portable welding system and a second output of the portable welding system, wherein the two switches, the at least one electronic switch of the second full bridge converter and the switches of the first full bride converter are separated respectively,
the method further comprising automatically engaging the wire feeder according to input received via the graphical user interface.

9. The method of claim 8, wherein the DC welding current is configured for a DC welding process.

10. The method of claim 9, wherein the DC welding process is a metal inert gas (MIG) welding process.

11. The method of claim 8, wherein the AC welding current is configured for an AC welding process.

12. The method of claim 11, wherein the AC welding process is an AC tungsten inert gas (TIG) welding process.

13. The method of claim 8, further comprising automatically configuring the polarity of the DC welding current, when output, according to input received via the graphical user interface.

14. The method of claim 8, further comprising selecting the polarity of the DC welding current, when output, via a manual switch.

* * * * *